UNITED STATES PATENT OFFICE.

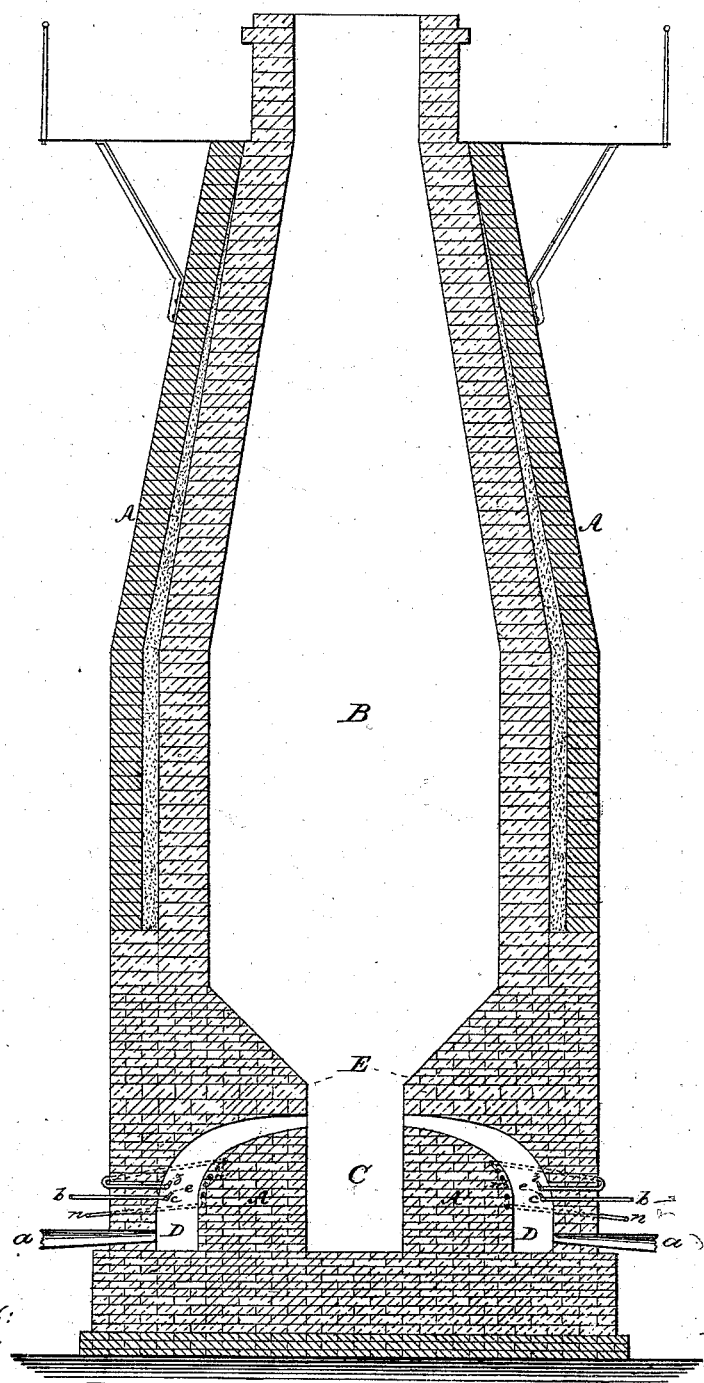

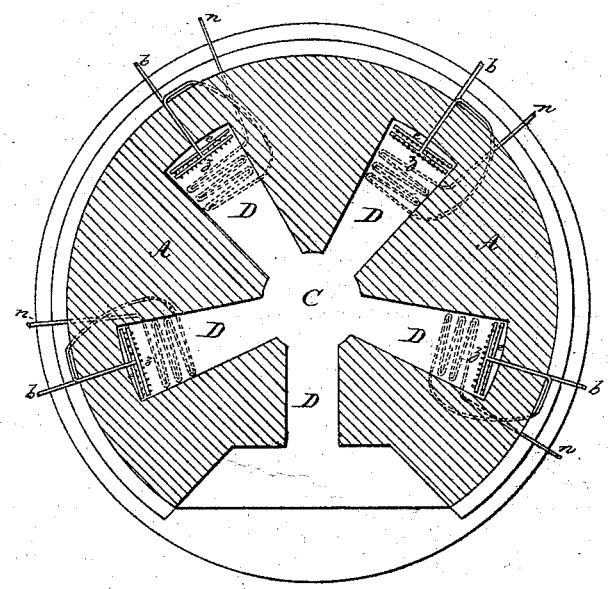

JAMES G. BLUNT, OF LEAVENWORTH, KANSAS.

IMPROVEMENT IN BLAST-FURNACES.

Specification forming part of Letters Patent No. 137,884, dated April 15, 1873; application filed April 5, 1873.

*To all whom it may concern:*

Be it known that I, JAMES G. BLUNT, of the city of Leavenworth, county of Leavenworth and State of Kansas, have invented a new and useful Improvement in Reducing or Smelting Iron and other Metalliferous Ores by the use of hydrocarbon-vapor or fixed gas, with or without the use of superheated steam, the same being a new and useful invention for the purpose aforesaid; and I hereby declare that the following is a full and exact description of the same, reference being had to the accompanying drawing forming a part of this specification.

This invention relates to blast-furnaces for the reduction of iron ore and other metalliferous substances; and it consists in the construction and novel arrangement of devices whereby the vapor of petroleum or fixed carbon-gas, either by itself or in combination with hydrogen, (or superheated steam,) is applied as fuel in such furnaces. The object of this invention is to facilitate the smelting of iron ore by lessening the expenditure for fuel and the time required for its manipulation; also, in the cost in the construction of the furnace, from its less height and diameter, as in ordinary furnaces; and, also, to prevent at all times scaffolding or chilling, and allowing the operation of the furnace to cease at will. It is further designed—by the use of the petroleum-vapors and the gases used as fuel, before described—to more perfectly free the iron from sulphur and other impurities, and rendering the iron produced of superior quality and of greater value.

It is well known that ordinary blast-furnaces, using stone-coal or charcoal as fuel as a reducing-agent, are at all times liable to chill from the imperfect combustion of the fuel, and thus prevent the blast from passing through the mass of ore, flux, and fuel, and render the furnace useless until the charge is removed; but by the use of this petroleum-vapor as fuel the operation can at any time cease without detriment to the furnace, owing to the fact that the perfect combustion of the reducing-agent takes place at the bottom of the furnace, and in direct contact with the ore and flux.

Figure 1 represents a vertical section of the blast-furnace, showing interior arrangement of furnace and connections. Fig. 2 represents a plan, showing the combustion-chamber, burners, superheated-steam pipes, together with the sole or hearth.

Similar letters of reference in the several figures indicate corresponding parts.

In the accompanying drawing, letter A represents the wall of the furnace. Letter B represents the stack or ore-chamber, below which is located the hearth or receptacle for the melted ore C. Communicating with the hearth near its upper portion, and below the lower portion of the ore-chamber or bosh of the furnace, are one or more combustion-chambers or flues, D, which extend upward and inward in curve form through the lower and thicker portion of the furnace-wall A, in such a manner that while the lower ends are vertical, or nearly so, the upper ends are directly upward and inward toward the opening E in the base of the ore-chamber. Each combustion-chamber is thus divided from the hearth C by a partition of the furnace-wall A. The tuyeres, for the introduction of the air-blast at the lower and outer portion of the combustion-chamber, are indicated by $a$. Above each blast-opening the gas-pipe $b$ extends through the wall of the furnace, and is furnished with a cross-head, $c$, provided with a suitable number of jets or burners, $e$.

Hydrogen, in the form of superheated steam, is designed to be united with the petroleum or hydrocarbon vapor at the point of ignition in the following manner: A steam-pipe, $n$, is passed through the furnace-wall to the partition A between said combustion-chamber and the hearth C. After reaching this partition-wall it is made to traverse the same back and forth, forming a number of longitudinal folds or convolutions, as at $n'$, extending upward upon this partition-wall for some distance, when it is passed back through the furnace-wall, and again returned to the combustion-chamber D, and terminates in a series of jets, $z$, just above the vapor-burners.

The operation of my furnace is as follows: The ore and flux are first broken into convenient sizes, and in this condition is fed into the furnace in the usual manner until it is nearly full; and when thus charged the valves leading the hydrocarbon-vapors into the furnace are turned on and ignited. The valve connected with the blowing apparatus is also turned onto the tuyeres. The hydrocarbon-vapors and air are allowed to combine or mix in the combustion-chamber D, thence passing into the upper part of hearth C, and coming in direct contact with the ore in the lower part of ore-chamber E, the effect of which is to reduce the ore contained in the furnace, and, when in a molten state, pass down to the hearth in the ordinary manner.

In some cases I find that it is necessary to use a jet of superheated steam to aid in the reduction of some classes of ore; and when this is used I allow the ordinary steam to pass into the superheater, and thence into the furnace, regulating the flow by a valve. As the ore is reduced to a molten state, and the hearth or sole becomes full, it is drawn off in the usual manner, and fresh charges of ore and flux charged in at the throat of furnace, and the operation is continuous.

I find, by the use of this hydrocarbon-vapor, that an intense heat is generated, and in such a state of purity as to entirely decompose, evolve, and eliminate all impurities in the ore, which are carried off in form of vapor, the scoria or slag containing but a trace of the impurities originally contained in the ore.

I use in my furnace a hydrocarbon-vapor, generated from petroleum or any other hydrocarbon, by the use of superheated steam, in any apparatus used for that purpose, and conveyed to the furnace in a suitable manner. The steam I use is taken from any ordinary boiler used for that purpose, and the air used in this furnace is supplied by any well-known apparatus.

Having thus fully described my invention, what I claim as new, and desire to secure by Letters Patent, is—

1. The combustion-chamber D, in combination with the stack B, the bosh E, and hearth C, substantially as herein described, and for the purpose set forth.

2. The superheater $n$, in combination with the combustion-chamber D, the gas-pipe $b$, and tuyeres $a$, substantially as herein described, and for the purposes set forth.

JAS. G. BLUNT.

Witnesses:
 J. P. LOUGHRAN,
 JNO. L. PENDERY.